(12) United States Patent
Kamada et al.

(10) Patent No.: US 7,646,880 B2
(45) Date of Patent: Jan. 12, 2010

(54) MAKEUP METHOD BASED ON TEXTURE AND TEXTURE MAP

(75) Inventors: Yumiko Kamada, Tokyo (JP); Hiroko Yano, Tokyo (JP); Naoko Matsumoto, Tokyo (JP); Nobuko Yamada, Tokyo (JP); Chizuru Tomiyama, Tokyo (JP)

(73) Assignee: Shiseido Co., Ltd., Chuo-ku, Tokyo (JP)

( * ) Notice: Subject to any disclaimer, the term of this patent is extended or adjusted under 35 U.S.C. 154(b) by 493 days.

(21) Appl. No.: 10/526,216

(22) PCT Filed: Aug. 28, 2003

(86) PCT No.: PCT/JP03/10983

§ 371 (c)(1),
(2), (4) Date: Aug. 3, 2005

(87) PCT Pub. No.: WO2004/022008

PCT Pub. Date: Mar. 18, 2004

(65) Prior Publication Data

US 2006/0134153 A1  Jun. 22, 2006

(30) Foreign Application Priority Data

Sep. 2, 2002  (JP) .............................. 2002-256973

(51) Int. Cl.
*G06K 9/00* (2006.01)
(52) U.S. Cl. ...................... 382/100; 382/162; 382/167; 382/274; 382/293; 382/284; 424/401; 345/88; 345/13; 345/4; 348/36

(58) Field of Classification Search ................. 382/100, 382/162, 167, 274, 293, 284; 424/401; 345/88, 345/13, 4; 358/1.15, 1.14, 461, 518; 348/36; 73/29.04, 29.01, 29.02, 335.01; 206/216, 206/581, 305, 306, 385, 459.1, 16
See application file for complete search history.

(56) References Cited

U.S. PATENT DOCUMENTS

| | | | | |
|---|---|---|---|---|
| 5,304,809 A | * | 4/1994 | Wickersheim | 250/458.1 |
| 5,313,267 A | * | 5/1994 | MacFarlane et al. | 356/405 |
| 5,478,238 A | * | 12/1995 | Gourtou et al. | 434/100 |
| 5,557,324 A | * | 9/1996 | Wolff | 345/207 |
| 5,870,491 A | * | 2/1999 | Kawai et al. | 382/181 |

(Continued)

OTHER PUBLICATIONS

European Patent Office Communication for EP 03794124.2 dated Jul. 4, 2007, two pages.

(Continued)

*Primary Examiner*—Vikkram Bali
*Assistant Examiner*—Nancy Bitar
(74) *Attorney, Agent, or Firm*—Rankin, Hill & Clark LLP

(57) ABSTRACT

A texture word map is produced by selecting a plurality of texture words to express the makeup textures; classifying the plurality of selected texture words into two types; producing a texture word map by arranging one characteristic in the ordinate and the other characteristic in the abscissa and arranging positional correlations of the texture words one another in the coordinates of the ordinate and the abscissa. A texture image map is produced by overlapping individual images on the texture word map and makeup with a texture is done based on the texture image map.

13 Claims, 17 Drawing Sheets

U.S. PATENT DOCUMENTS

| | | | |
|---|---|---|---|
| 6,020,892 A * | 2/2000 | Dillon | 345/419 |
| 6,243,059 B1 * | 6/2001 | Greene et al. | 345/88 |
| 6,592,465 B2 * | 7/2003 | Lutz et al. | 473/198 |
| 6,603,571 B1 * | 8/2003 | Nomoto | 358/1.15 |
| 6,633,294 B1 * | 10/2003 | Rosenthal et al. | 345/474 |
| 6,850,243 B1 * | 2/2005 | Kilgariff et al. | 345/582 |
| 6,916,288 B2 * | 7/2005 | Nakata | 600/306 |
| 7,068,277 B2 * | 6/2006 | Menache | 345/473 |
| 7,218,320 B2 * | 5/2007 | Gordon et al. | 345/419 |
| 7,333,113 B2 * | 2/2008 | Gordon | 345/475 |
| 7,336,810 B2 * | 2/2008 | Fujii et al. | 382/128 |
| 7,358,972 B2 * | 4/2008 | Gordon et al. | 345/473 |
| 7,522,768 B2 * | 4/2009 | Bhatti et al. | 382/167 |
| 2002/0147627 A1 * | 10/2002 | Roosevelt et al. | 705/10 |
| 2006/0178904 A1 * | 8/2006 | Aghassian et al. | 705/1 |

OTHER PUBLICATIONS

European Patent Office Communication for EP 03794124.2 dated Oct. 24, 2008, five pages.

\* cited by examiner

MAKEUP METHOD BASED ON TEXTURE AND TEXTURE MAP

TECHNICAL FIELD

The invention relates to a makeup method for mapping image expansion of an image of makeup based on a relation between the makeup and texture as well as the texture and effectively rendering an image of the makeup based on the texture, and to a texture map therefor.

BACKGROUND ART

Conventionally, facing, so-called makeup, is composed of broadly three important factors, i.e., color, shape, and texture. The makeup with color is based on arrangement and mapping of effects of makeup color of such as a lipstick and an eye shadow applied to the respective parts of a face, and the makeup with shape is based on arrangement and mapping of effects of makeup based on the shape such as the face outline, the positions and shapes of the eyes, the nose, the lips and the hairline. The effects of makeup based on the color and the shape have been previously disclosed by the applicant of the present invention as results of investigations, but, with respect to the texture, comprehensive and collective investigations have not been performed yet. The textures of makeup are images of liveliness, vividness, softness, serenity, and so forth which can not be expressed by the color or shape, and expressed with words such as sweetness, feminine, cool/sharp, and so forth and mainly brought by materials of cosmetics. Particularly, recently bright and shining makeup just like brilliant eyes and glossy lips have drawn attention and thus the texture tends to be regarded to be important. Although the relations between the makeup and textures have been accumulated as practical experiences of individual cosmeticians, they have been neither integrated nor established collectively.

DISCLOSURE OF THE INVENTION

Problem to be Solved by the Invention

An object of the present invention is to collectively arrange relations between makeup and textures and provide an effective makeup method based on the texture and a texture map to be used for the makeup method, which have not been proposed yet.

Means for Solving the Problem

Means employed for this invention to solve the above-mentioned problem is characterized by comprising: selecting a plurality of texture words to express the makeup textures; classifying the plurality of selected texture words into two types; producing a texture word map by arranging one characteristic in the ordinate and the other characteristic in the abscissa and arranging positional correlations of the texture words one another in the coordinates of the ordinate and the abscissa; producing a texture image map by overlapping individual images on the texture word map; and performing makeup with a texture according to the texture image map.

It is characterized in that the texture image map is examined based on results of questionnaire regarding photographs of models to whom makeup has been actually applied in the skins, eyes, and lips to produce three types of texture image maps, i.e., a skin texture map, an eye texture map, and a lip texture map; and makeup with a texture is performed according to the three types of texture image maps.

It is characterized in that the three texture image maps are put in order with words for every image zone to produce texture map tables; and makeup with a texture is performed according to the texture map tables.

It is characterized in that the texture words consists of nine texture words, i.e., 1. standard: a texture giving properly covering power and natural glossy impression; 2. mat: a texture giving solemn, dull surface, heavy, and concealing impression; 3. sheer: a texture giving transparent and light impression; 4. pearly: a texture giving delicate and glossy impression just like smooth and luster pearl; 5. dispersed pearl: a texture giving blinking and sparkling impression just like dispersedly existing pearls; 6. metallic: a texture giving strongly bright impression just like the metal surface; 7. glitter: a texture giving vividly bright impression just like lames; 8. glossy: a texture giving impression of wettish gloss and damply and strong luster; and 9. foggy: a texture giving soft and powdery impression.

It is characterized in that the textures are classified into three characteristics, i.e., austerity, transparency, and gloss, and the austerity and transparency are arranged collectively in the ordinate as a volume axis and the gloss in the abscissa as a gloss axis.

It is characterized in that the individual image is composed of four type images, i.e., "cute/pretty", "fresh/active", "soft/feminine" and "cool/sharp".

It is characterized in that the degree of the possible image rendering extent is written on the texture map and the correlation of the textures or the balance of the texture and image is expressed on the map.

EFFECTS OF THE INVENTION

According to the invention, the texture map is used as a tool for counseling customers on actual makeup in shops and effective makeup for customers is made possible. Also, the texture map is utilized for image rendering for giving good texture, and it is made possible for the middle to elder age to confirm regions of the skins which give good texture.

BEST MODE FOR CARRYING OUT THE INVENTION

Figure 1:
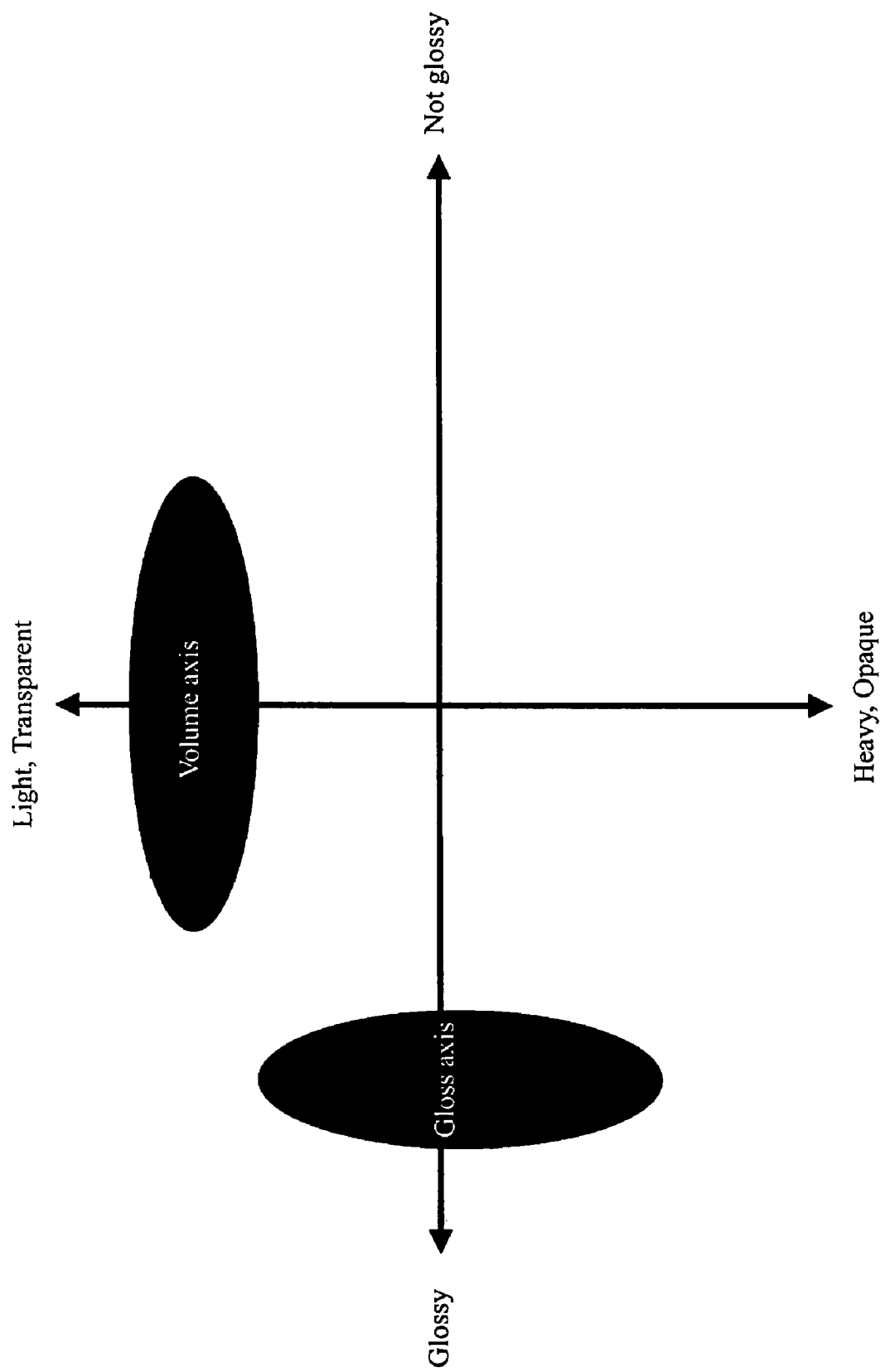
FIG. 1 is a graph showing a gloss axis and a volume axis.

Hereinafter, a preferable embodiment of the invention will be described in detail. Based on investigations on relations of makeup and textures, that is, how textures work on and affect the image rendering by makeup, the invention gives a map of a makeup image extent according to the texture and thus makes it possible to easily and efficiently render the makeup image based on the texture. The texture is expressed by 9 words and the respective words are defined as the following meanings. That is, 1. standard: a texture giving properly covering power and natural glossy impression; 2. mat: a texture giving solemn, dull surface, heavy, and concealing impression; 3. sheer: a texture giving transparent and light impression; 4. pearly: a texture giving delicate and glossy impression just like smooth and luster pearl; 5. dispersed pearl: a texture giving blinking and sparkling impression just like dispersedly existing pearls; 6. metallic: a texture giving strongly bright impression just like the metal surface; 7. glitter: a texture giving vividly bright impression just like lames; 8. glossy: a texture giving impression of wettish gloss and damply and strong luster; and 9. foggy: a texture giving soft and powdery impression. The nine texture words are classified into three characteristics, i.e., austerity, transparency, and gloss. Further, the austerity and transparency are arranged collectively in the ordinate as a volume axis and the gloss in the abscissa as a gloss axis, so that texture word mapping is carried out for visualizing the positional correlations of the textures according to results of questionnaire.

Individual images composed of "cute/pretty", "fresh/active", "soft/feminine" and "cool/sharp" are overlapped on the texture word map to produce a texture image map and make the map usable as indexes showing the relations between the makeup and textures. Next, the texture image map is examined based on results of questionnaire regarding photographs of models to whom makeup has been actually applied in the skins, eyes, and lips to produce a skin texture map, an eye texture map, and a lip texture map. Further, the three texture image maps are put in order with words for every image zone to produce texture map tables. The degree of the possible image rendering extent is written on the texture map table to clarify the correlation of the textures or the balance of the texture and image, thereby enabling makeup based on the texture.

EXAMPLES

With reference to drawings, preferable examples of the invention will be described. First, to investigate how the makeup image was expanded and changed according to textures, the terms expressing the textures were put in order. Next, how the textures of the skin, eyes, and lips appeared and what images the textures gave were investigated and finally combination and balance of the textures were investigated. To arrange the terms expressing the textures, words relevant to the textures were extracted and what kind feelings such words had were investigated by questionnaire. With respect to how the textures of the skin, eyes, and lips appeared and what images the textures gave, and combination and balance of the textures, the characteristics of the textures, images, and fondness were determined according to the judgments and questionnaire regarding the photographs of models to whom makeup has been applied. The questionnaire was carried out for cosmetic technicians including technicians with 8 year or longer makeup experience and persons in charge of brand products 16 persons; ordinary monitors in twenties and fifties each 30 persons in total 76 persons. The panelist persons taking questionnaire were all highly aware of cosmetic sense. Each one person in twenties and fifties was selected among models to be photographed. The model in twenties was a woman having normal skin with little skin trouble to express various textures, and the model in fifties was a woman having uneven skin with little stain but wrinkles and pores. The photographs were taken basically under natural light and the angle of the faces was so set as to effectively appreciate the texture. Further, in order to make the directions of the textures clear, special cosmetics were made ready for the eye color and lip color.

The words regarding the textures were picked-up among words relevant to textures and makeup from cosmetic manuals and magazines. Among the picked-up words relevant to the textures and makeup, the texture words with characteristic difference on the expression of makeup of the skin, eyes, and lips were extracted, and many selected words were further selected based on questionnaire for the cosmeticians and the experiences of the cosmeticians. As a result, 9 texture words, i.e., 1. standard, 2. mat, 3. sheer, 4. pearly, 5. dispersed pearl, 6. metallic, 7. glitter, 8. glossy, and 9. foggy, were selected. The definitions of the respective texture words were as followings: "standard" is a texture giving properly covering power and natural glossy impression: "mat" is a texture giving solemn, dull surface, heavy, and concealing impression: "sheer" is a texture giving transparent and light impression: "pearly" is a texture giving delicate and glossy impression just like smooth and luster pearl: "dispersed pearl" is a texture giving blinking and sparkling impression just like dispersedly existing pearls: "metallic" is a texture giving strongly bright impression just like the metal surface: "glitter" is a texture giving vividly bright impression just like lames: "glossy" is a texture giving impression of wettish gloss and damply and strong luster: and "foggy" is a texture giving soft and powdery impression.

Figure 2:
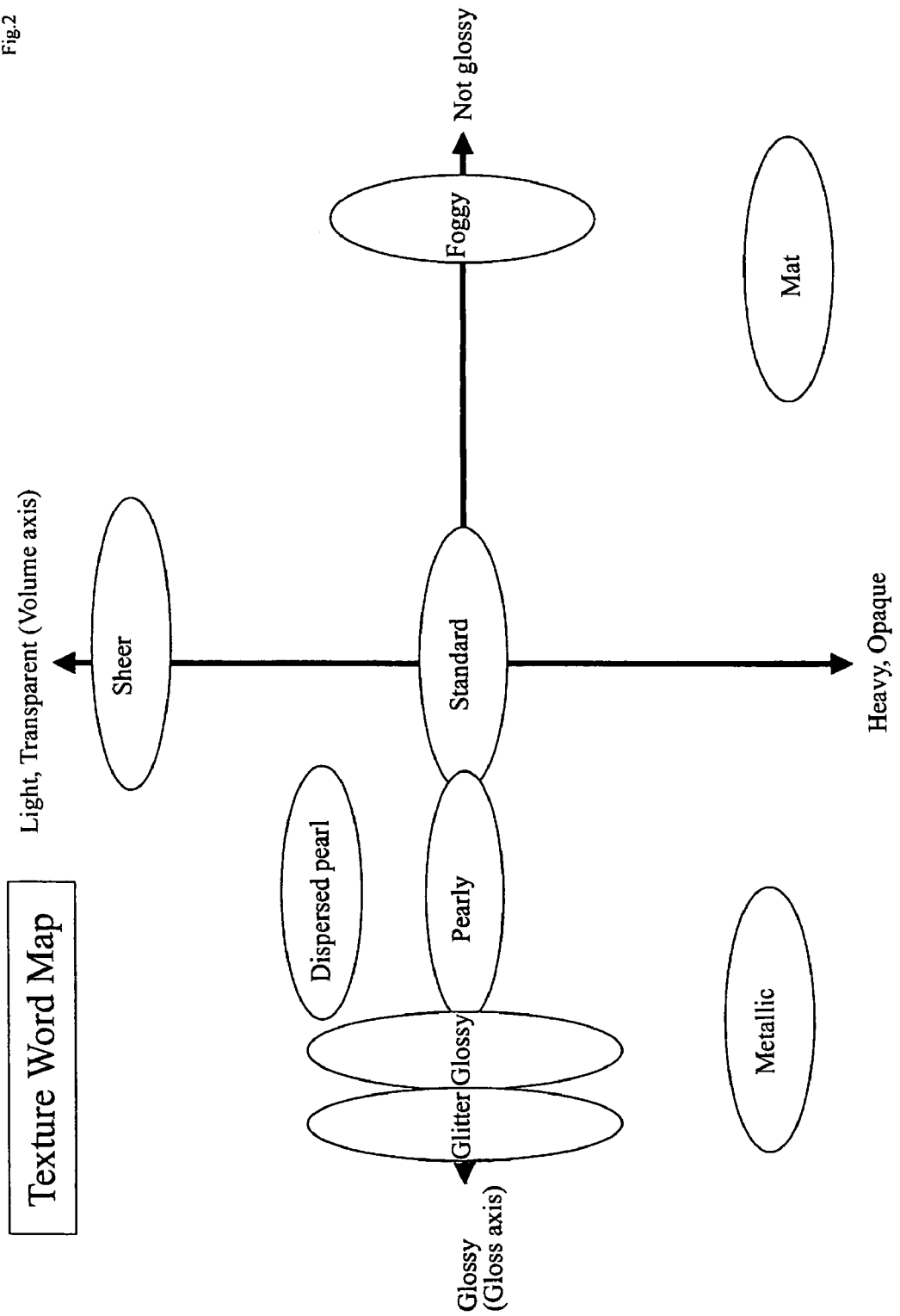
FIG. 2 is a graph showing a texture word map.

The texture means that the impression produced owing to the difference of the properties of materials, and therefore, what kinds of properties these nine textures have were investigated. As a result, it was made clear that the following three properties were included: "austerity" expressing lightness and heaviness, "transparency" expressing transparent and opaque degree, and "gloss" expressing glossy or not glossy. Therefore, the three properties were classified into two and as shown in FIG. 1, glossy and not glossy textures were divided and arranged in the abscissa relevant to the gloss, and the abscissa was set to be a gloss axis. Next, the austerity was arranged as light and heavy and the transparency was arranged as transparent and opaque degree in the ordinate, and the ordinate was set to be a volume axis. Points were calculated from the results of the word questionnaire for cosmetic technicians and the results were arranged along the gloss axis and the volume axis while the standards of the 9 kinds of textures were set in the center to obtain the word map as illustrated in FIG. 2 showing the positional correlations of the textures. Hereinafter, the map is referred to as "texture word map". In the texture word map, the respective textures were expanded in the ordinate and abscissa, and it means that the glossy degree or the volume degree of the respective textures has a margin. For example, the textures such as "standard, sheer, dispersed pearl, pearly, mat, and metallic"

had a wide margin in the direction of the gloss axis but a narrow margin in the direction of the volume axis. The textures such as "glitter, glossy, and foggy" had, on the contrary, a wide margin in the direction of the volume axis but a narrow margin in the direction of the gloss axis.

Figure 3:
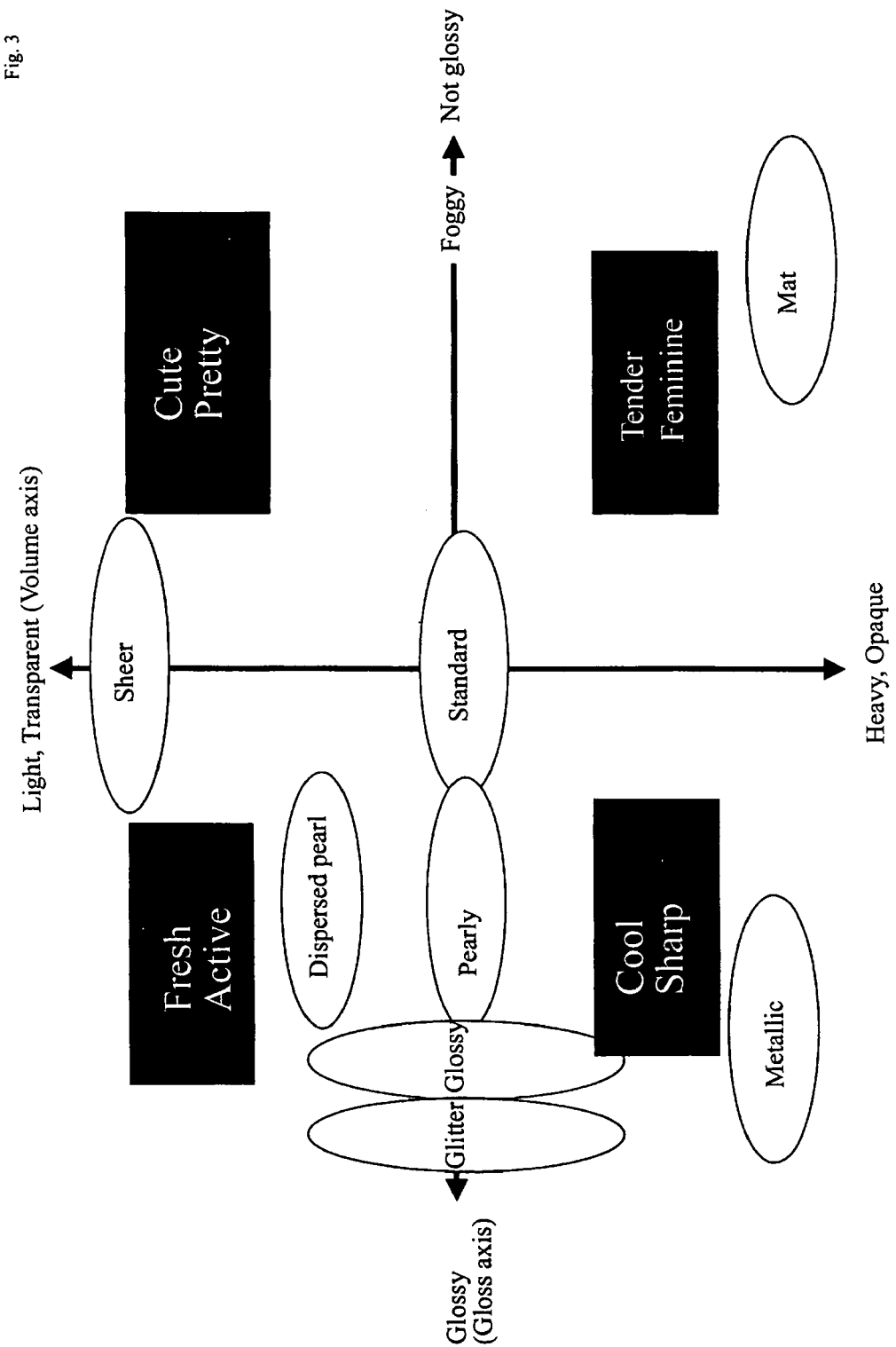
FIG. 3 is a graph showing a texture image map.

Next, practically textures of the skins, eyes, and lips were given and what kind impression the faces gave and also how the images were expanded were investigated based on questionnaire taken by cosmetic technicians while utilizing the above-mentioned texture word map. As conventional experiential knowledge of the cosmetic technicians, when makeup is to be done, mat is used for feminine and soft image expression, and sheer is used for fresh and active image expression. Therefore, four image zones creating individual images, i.e., "cute/pretty", "fresh/active", "soft/feminine" and "cool/sharp", were overlapped on the above-mentioned texture word map to obtain a map relevant to the texture images as shown in FIG. 3. Hereinafter, the map is referred to as "texture image map". The texture image map was used as indexes expressing the relations of the makeup and textures and successively, the usability of the texture image map as the indexes was investigated according to the results of questionnaire taken by cosmetic technicians.

Figure 4:
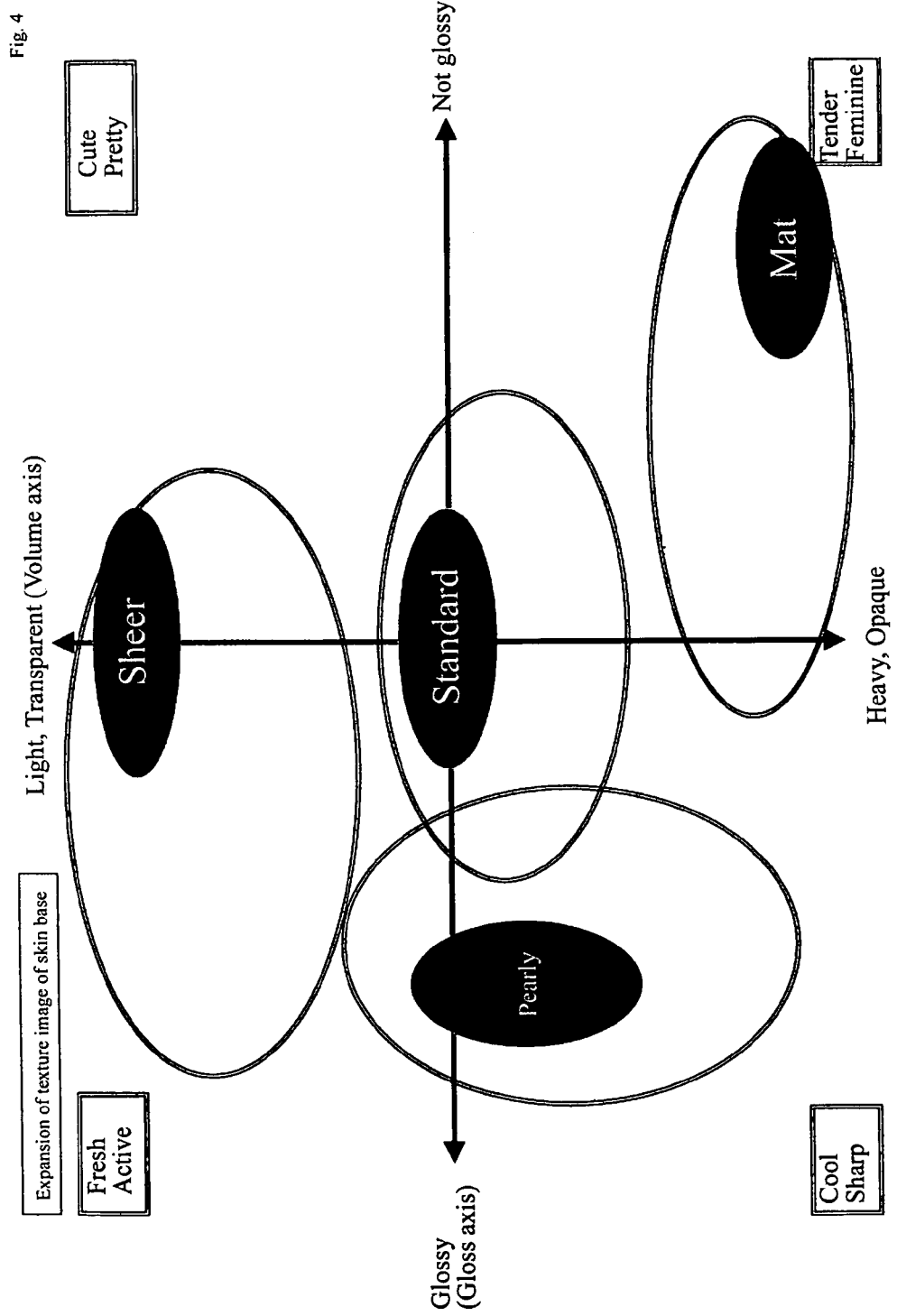
FIG. 4 is a graph showing a skin texture image map.

The investigation of the texture image map was first carried out for the skin. Based on the experiences of the cosmetic technicians, the texture expressing the skin base, glitter or glossy was not practical. The textures of the skin base presently possible to be supposed according to the experiences were limited to four types, i.e., standard, mat, sheer and pearly, and other textures were found not usable for skin base. As the textures expressing the skin base, "standard" gave a properly covering power and natural glossy finishing image: "mat" gave a finishing image with powdery skin surface; "sheer" gave a transparent finishing image just like bare skin; and "pearly" gave a finishing image of the skin with pearly (gloss) texture. Then, models were photographed after makeup has been done, and then, the photographs were shown to panelists to take the questionnaire regarding two kinds of items, i.e., the characteristics of the textures and the images how the photographs were seen. The items of the questionnaire were as shown in Table 1. The results were overlaid to obtain the skin texture map of FIG. 4. As being made clear from the skin texture map, it was understood that the texture word map shown in FIG. 2 and the skin texture map shown in FIG. 4 were approximately coincident with each other in the characteristics of the texture, except "pearly". In the texture image map shown in FIG. 3, "pearly" was positioned in the middle in the volume axis, but, the texture gave strongly glossy and slightly thick impression when the skin was made up. It was supposedly attributed to that the pearly feeling gave concealing image to the skin depending on the angle since the skin had a wide surface area. In FIG. 4, the regions surrounded with the elliptical lines show the expansion of the images and the width shows the extent of the image expansion. With respect to "pearly", almost all answers to questionnaire said that cool/sharp impression was given and fresh/active impression was also given, and therefore, the region of the image was found having an elliptical shape extended in the direction of the volume axis and also having a width in the direction of the gloss axis. Accordingly, it could be said that if the skin with pearly texture was selected, it was effective to render cool/sharp and fresh/active images.

TABLE 1

Please select one photograph among the following photographs (1) to (4) in the sheet A that is appropriate to the following questions and write the number of the photograph.

| | |
|---|---|
| 1. Which one gives transparent impression? | 1. _____ |
| 2. Which one gives thickness (covering power)? | 2. _____ |
| 3. Which one gives intense gloss? | 3. _____ |
| 4. Which one gives pearly impression? | 4. _____ |
| 5. Which one gives warm impression? | 5. _____ |
| 6. Which one gives cool impression? | 6. _____ |
| 7. Which one gives natural luster? | 7. _____ |
| 8. Which one gives young impression? | 8. _____ |
| 9. Which one gives pretty impression? | 9. _____ |
| 10. Which one gives adult image? | 10. _____ |
| 11. Which one gives active, vigorous (dynamic) impression? | 11. _____ |
| 12. Which one gives serenity (calmness)? | 12. _____ |
| 13. Which one gives feminine (tender) impression? | 13. _____ |
| 14. Which one gives graceful impression? | 14. _____ |
| 15. Which one gives cool/sharp impression? | 15. _____ |
| 16. Which one gives intellectual impression? | 16. _____ |
| 17. Which one gives fresh (light) impression? | 17. _____ |
| 18. Which one gives most beautiful skin? (reason: ) | 18. _____ |
| 19. Which skin do you like? (reason: ) | 19. _____ |
| 20. Which skin do you dislike (reason: ) | 20. _____ |
| 21. Which skin do you like to makeup (reason: ) | 21. _____ |

Figure 5:
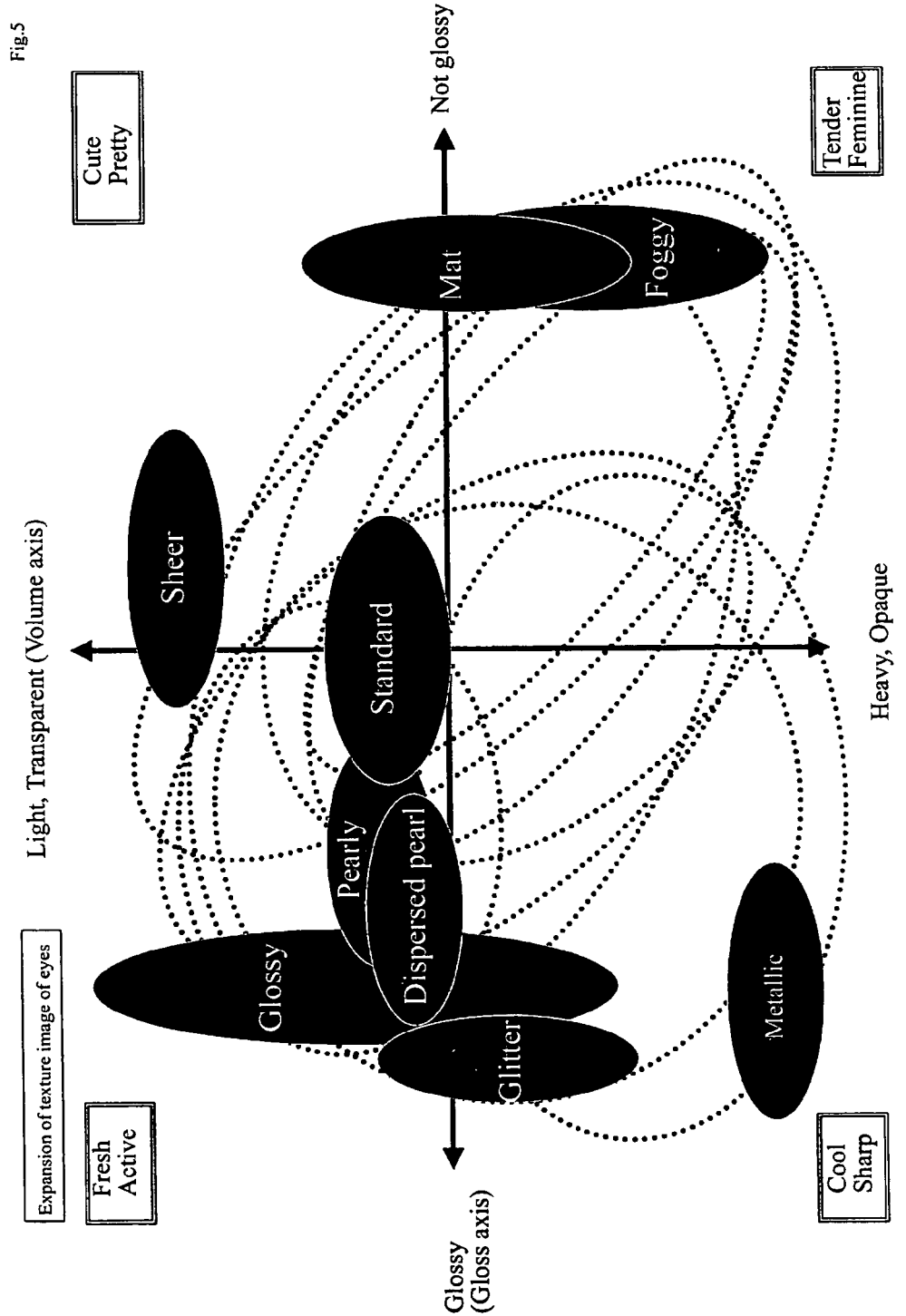
FIG. 5 is a graph showing an eye texture image map.
Figure 6:
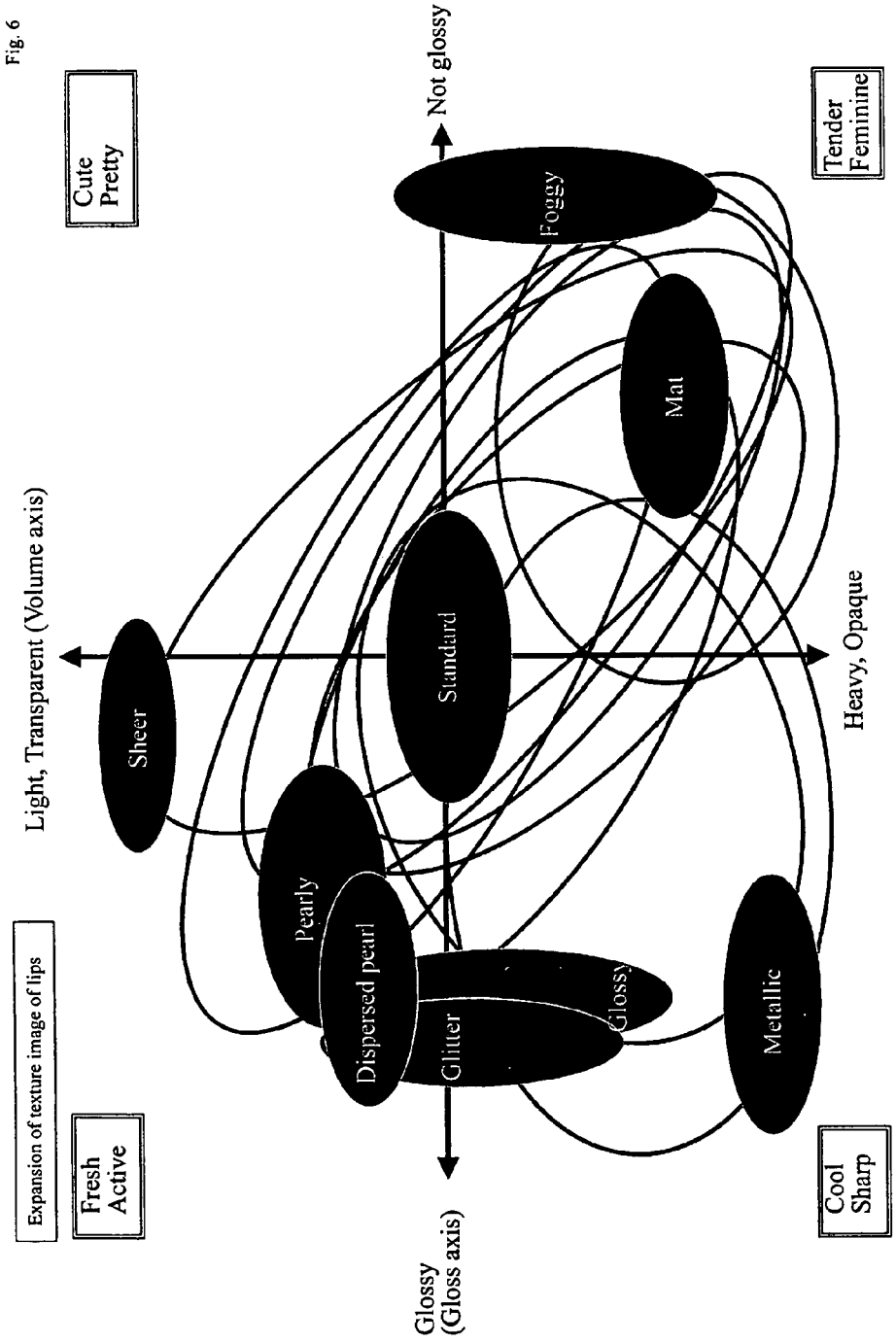
FIG. 6 is a graph showing a lip texture image map.

Next, with respect to the textures expressing the eyes and lips, FIG. 5 shows an eye texture map showing the extent of the eyes and texture images, and FIG. 6 shows a lip texture map showing the extent of the lips and texture images. The nine textures expressing the eyes and lips are as follows: standard gives properly covering power and natural glossy impression: sheer gives transparent and light impression: pearly gives smooth and luster pearl-like impression: dispersed pearl gives sparkling impression just like dispersedly existing pearls: metallic gives strongly bright impression just like the metal surface: glitter gives vividly bright impression: glossy gives impression of wettish gloss and damply and strong luster: and foggy gives soft and powdery impression. Then, models were photographed after eye and lip makeup has been done, and then the photographs were shown to panelists just like the case of skin base to take the questionnaire regarding two kinds of items, i.e., the characteristics of the textures and the images how the photographs were seen. The items of the questionnaire were as shown in Table 2. The results were overlaid on the texture word map to obtain an eye texture map shown in FIG. 5 and a lip texture map shown in FIG. 6. The questionnaire as shown in Table 2 was done by evaluating the respective items in 5 grades. Tables 3 and 4 are items of the questionnaire for the model in fifties, and Table 3 is relevant to the questionnaire items of skin texture and Table 4 is relevant to the questionnaire items of the eyes and lips.

TABLE 2

Please circle the proper point on the 5-1 scale for the questions with respect to the photograph of B-(1), where 5 = Positive, 4 = Rather Positive, 3 = Neither, 2 = Rather Negative, 1 = Negative.

| | |
|---|---|
| 1. Seemingly transparent | 5 4 3 2 1 |
| 2. Seemingly natural gloss | 5 4 3 2 1 |
| 3. Seemingly thick (covering power) | 5 4 3 2 1 |
| 4. Seemingly weak gloss | 5 4 3 2 1 |
| 5. Seemingly strong gloss | 5 4 3 2 1 |
| 6. Seemingly wet | 5 4 3 2 1 |
| 7. Seemingly pearly | 5 4 3 2 1 |
| 8. Seemingly light | 5 4 3 2 1 |
| 9. Seemingly feathery and warm | 5 4 3 2 1 |
| 10. Seemingly cold | 5 4 3 2 1 |
| 11. Seemingly high color | 5 4 3 2 1 |

TABLE 2-continued

| | |
|---|---|
| 12. Seemingly soft | 5 4 3 2 1 |
| 13. Seemingly luster | 5 4 3 2 1 |
| 14. Seemingly serene | 5 4 3 2 1 |
| 15. Seemingly powdery | 5 4 3 2 1 |
| 16. Seemingly thin makeup | 5 4 3 2 1 |
| 17. Seemingly young | 5 4 3 2 1 |
| 18. Seemingly cute | 5 4 3 2 1 |
| 19. Seemingly brilliant | 5 4 3 2 1 |
| 20. Seemingly adult | 5 4 3 2 1 |
| 21. Seemingly soft | 5 4 3 2 1 |
| 22. Seemingly active, vigorous (dynamic) | 5 4 3 2 1 |
| 23. Seemingly calm (still) | 5 4 3 2 1 |
| 24. Seemingly feminine (tender) | 5 4 3 2 1 |
| 25. Seemingly grace | 5 4 3 2 1 |
| 26. Seemingly cool/sharp | 5 4 3 2 1 |
| 27. Seemingly intellectual | 5 4 3 2 1 |
| 28. Seemingly fresh | 5 4 3 2 1 |
| 29. Seemingly soft | 5 4 3 2 1 |
| 30. Seemingly hard | 5 4 3 2 1 |
| Please select one photograph among the following questions and write the number of the photograph. | |
| 1. Which eyes do you think are most beautiful? (reason:_____) | 1.____ |
| 2. Which eyes do you like? (reason:_____) | 2.____ |
| 3. Which eyes do you dislike? (reason:_____) | 3.____ |
| 4. Which eyes do you want to makeup? (reason:_____) | 4.____ |

TABLE 3

Please select one photograph among the following photographs (1) to (4) in the sheet A that is appropriate to the following questions and write the number of the photograph.

1. Which one gives transparent impression?
2. Which one gives thickness (covering power)?
3. Which one gives intense gloss?
4. Which one gives pearly impression?
5. Which one gives warm impression?
6. Which one gives cool impression?
7. Which one gives natural luster?
8. Which one gives young impression?
9. Which one gives soft, tender impression?
10. Which one gives adult image?
11. Which one gives active (dynamic) impression?
12. Which one gives serenity (calmness)?
13. Which one gives feminine impression?
14. Which one gives graceful impression?
15. Which one gives cool impression?
16. Which one gives intellectual impression?
17. Which one gives fresh (light) impression?
18. Which one gives noticeable loosening impression?
19. Which one has noticeable dents?
20. Which one has noticeable wrinkles (transverse and vertical wrinkles)?
21. Which one seems dull?
22. Which one has noticeable pores?
23. Which one seems makeup loosening?
24. Which one seems tire?
25. Which one seems old?
26. Which one seems lonely?
27. Which one seems not graceful?
28. Which skin do you think most beautiful? (reason:   )
29. Which skin do you like? (reason:   )
30. Which skin do you dislike? (reason:   )
31. Which skin do you want to makeup? (reason:   )

TABLE 4

Please circle the proper point on the 5-1 scale for the questions with respect to the photograph of B-(1), where 5 = Positive, 4 = Rather Positive, 3 = Neither, 2 = Rather Negative, 1 = Negative.

| | |
|---|---|
| 1. Seemingly transparent | 5 4 3 2 1 |
| 2. Seemingly natural gloss | 5 4 3 2 1 |
| 3. Seemingly thick (covering power) | 5 4 3 2 1 |
| 4. Seemingly weak gloss | 5 4 3 2 1 |

TABLE 4-continued

Please circle the proper point on the 5-1 scale for the questions with respect to the photograph of B-(1), where 5 = Positive, 4 = Rather Positive, 3 = Neither, 2 = Rather Negative, 1 = Negative.

| | |
|---|---|
| 5. Seemingly strong gloss | 5 4 3 2 1 |
| 6. Seemingly wet | 5 4 3 2 1 |
| 7. Seemingly pearly | 5 4 3 2 1 |
| 8. Seemingly light | 5 4 3 2 1 |
| 9. Seemingly feathery and warm | 5 4 3 2 1 |
| 10. Seemingly cold | 5 4 3 2 1 |
| 11. Seemingly high color | 5 4 3 2 1 |
| 12. Seemingly soft | 5 4 3 2 1 |
| 13. Seemingly luster | 5 4 3 2 1 |
| 14. Seemingly serene | 5 4 3 2 1 |
| 15. Seemingly powdery | 5 4 3 2 1 |
| 16. Seemingly thin makeup | 5 4 3 2 1 |
| 17. Seemingly young | 5 4 3 2 1 |
| 18. Seemingly tender and calm | 5 4 3 2 1 |
| 19. Seemingly brilliant | 5 4 3 2 1 |
| 20. Seemingly adult | 5 4 3 2 1 |
| 21. Seemingly soft | 5 4 3 2 1 |
| 22. Seemingly active (dynamic) | 5 4 3 2 1 |
| 23. Seemingly calm (still) | 5 4 3 2 1 |
| 24. Seemingly feminine | 5 4 3 2 1 |
| 25. Seemingly grace | 5 4 3 2 1 |
| 26. Seemingly cool | 5 4 3 2 1 |
| 27. Seemingly intellectual | 5 4 3 2 1 |
| 28. Seemingly fresh (light) | 5 4 3 2 1 |
| 29. Seemingly soft | 5 4 3 2 1 |
| 30. Seemingly hard | 5 4 3 2 1 |

Two characteristic incidents were observed in the eye texture map showing the extent of eyes and texture images shown in FIG. 5. One was that glossy had a width in the direction of the volume axis. Glossy means wettish gloss and damply and strong luster and it was derived in two-ways: in the direction of feeling oil and thus heavy and in the direction of feeling watery and thus light. Therefore, the region in the direction of the volume axis was supposedly widened. The other was relevant to mat and it gave lighter impression and was thus positioned higher than that in the texture word map shown in FIG. 2. It is supposedly attributed to that the concealing power of the mat made the eyelids soft and luminous to give light impression when the mat makeup of eyelids was done. Further, the mat image was extended to four image zones and the region in the tender, feminine image zone was widest, so that it can be understood that the feminine image can effectively be rendered by giving mat texture. Similarly to other textures, since images for the respective textures were extended, it can be understood that various ways of rending are possible.

With respect to lip texture map showing the lips and texture images shown in FIG. 6, a characteristic texture was sheer. The sheer in the lip texture map was positioned in the direction shifted slightly more in the direction of slightly gloss than that in the texture word map shown in FIG. 2. It is supposedly attributed to that the natural wettish gloss of a lipstick gave luster image. The texture image was expanded in a zone from a fresh/active zone to a tender, feminine zone, and it was made clear that the lightness of the sheer was effective to render the tender and feminine images. The eye texture map and the lip texture map shown in FIGS. 5 and 6 are overlapped in the image regions of the respective nine textures and therefore hardly distinguished from others, so that the respective textures are separately shown in FIGS. 7 to 15 while the texture images of both eyes and lips are overlapped. When the three types of the texture maps of the skin, eyes, and lips were compared with the texture word maps and the respective textures were investigated, the texture words and the texture images by makeup were found overlapped. Accordingly, it was found that the relations of the makeup and the textures could be expressed by the three types of the skin texture map (FIG. 4), the eye texture map (FIG. 5), and the lip texture map (FIG. 6).

Figure 16:
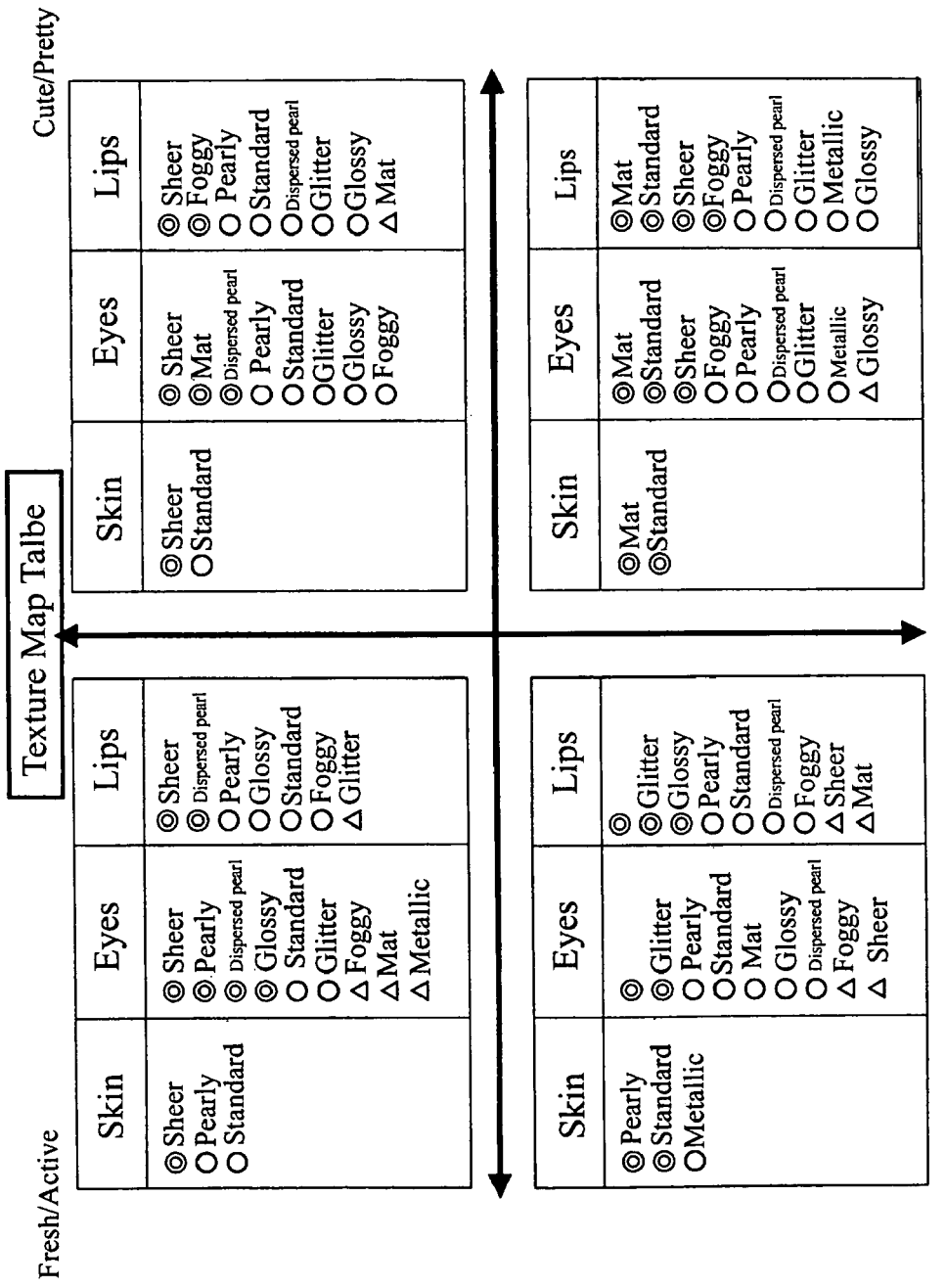
FIG. 16 is a graph showing a texture image map table.

In consideration of the utilization easiness for cosmetic technicians at stops, a texture map table was produced by putting the three types of texture maps of the skin, eyes, and lips in order with the words for every image zone (reference to FIG. 16). In this texture map table, the texture with the widest image region was marked with ◉ since strong image rendering was possible; the texture with the secondary widest image region was marked with ○; and the texture with the narrowest image region was marked with Δ since slight image rendering was possible. Accordingly, it is possible to combine only the textures marked ◉ for rendering an image and emphasizing the image. However in such a case, makeup image is often insufficient in wide and expanded expression for the person to be made up and is possibly a lack of balance. For example, in the case of combination of eye and lip textures with mat skin, the following three cases were investigated: makeup was finished entirely with mat marked ◉; next, metallic marked ○ was combined; and finally dispersed pearl marked ○ was combined. If the point makeup for the eyes and lips was finished on the mat skin with similarly mat texture, three textures are overlapped to result in emphasis of the feminine image. Next, if the metallic textures of the eyes and lips with strong contrast were combined, the entire texture was serenity and strong gloss and the metallic texture was emphasized to result in emphasis of gorgeous, cold, and brilliant images. However, there are responses that the point makeup was too emphasized. Finally, if the dispersed pearl textures of the eyes and lips with weak contrast were combined, the entire impression was well-balanced impression and the image was expanded in four image zones to make it clear that various image rendering was possible.

From these results, in collective arrangement of the correlations of the skin texture and the balance of the eye and lip textures, if the same textures of the skin, eyes, and lips are combined, the characteristics of the texture are emphasized as they are to result in directional emphasis of the image. If the textures of the eyes and lips were strong to the texture of the skin, the characteristics of the respective textures were found persisting and outstanding. It is supposed necessary to keep good balance of the intensity of the textures. On the contrary, if the textures of the eyes and lips were weak, it was found that good harmony and balance could be obtained and positive image was expanded. It was found that if either one of the textures of the eyes and lips was made strong to the texture of the skin and the other was made weak, the image was shifted to the direction of the strong texture. Such a correlation of the texture and the balance is collectively arranged in Table 5. This balance rule can be utilized for selecting cosmetic products and image rendering. In the case glossy marked Δ was applied thick to mat skin in the tender, feminine image zone, the evaluation according to the questionnaire was a dislikable and indecent image. From this result, in the case of using the texture marked Δ, it was found that the amount of the use was needed to be slight and proper.

TABLE 5

Correlation of the Texture and Balance

| Skin × eyes × lips | Characteristics |
| --- | --- |
| Skin × same texture × same texture | The characteristics of the texture were emphasized as they are. The direction of the image was emphasized. |
| Skin × strong texture × strong texture | The characteristics of the respective textures persisted outstandingly The intensity of the texture should be adjusted. |
| Skin × weak texture × weak texture | Good entire harmony was obtained and the image was expanded. |
| Skin × strong texture × weak texture | The image was shifted in the direction of the respective strong textures. |

Next, the case of utilizing the texture map in a shop and performing makeup of a customer who comes to the shop will be described. In the case the customer desired to have makeup with pearly skin or to render fresh/active image, the pearly skin with ○ mark in the fresh/active image zone in FIG. 16 was selected, and to make the pearly skin outstanding, the sheer marked ◉ was selected for the eye and lip textures. Combination of the sheer textures which differed from that of the skin made the pearly skin vivid and outstanding and entire makeup energetic and gave a fresh/active image. In such a manner, the texture map can be utilized from the aspect of the textures of products and from the aspect of the images.

The textured makeup for the middle to elder age is as shown in Table 6 and with respect to the eyes, the metallic existing in the luster direction made even wrinkles luster and although the glitter was gorgeous, it emphasized the dents. With respect to the lips, along with aging, the vertical wrinkles tended to be noticeable and the glossy with strongly wettish was easy to smear and the answers to the questionnaire said that the image was also indecent and filthy. When the makeup with standard texture was done for the model in fifties, the makeup gave proper covering power and natural glossy impression and the makeup was decent, gorgeous and tasteful. Next, when the makeup was done with entirely mat texture, the makeup gave slight dry but formal impression and gave a decent and calm image similarly to the case of the standard. When the makeup was done with sheer texture, the makeup gave natural glossy and transparent impression and the makeup gave a fresh, light image as ordinal makeup texture. Finally, when the makeup was done with entirely pearly texture, the entire face became bright like a Buddha sculpture and the aging phenomenon with noticeable wrinkles and pores became outstanding.

| Texture Items | Standard | Mat | Sheer | Pearly | Dispersed Pearl | Metallic | Glitter | Glossy | Foggy |
| --- | --- | --- | --- | --- | --- | --- | --- | --- | --- |
| Skin | ◉ | ○ | ○ | x | — | — | — | — | — |
| Eyes | ◉ | ◉ | ○ | x | x | x | x | x | x |
| Lips | ◉ | ◉ | ◉ | ○ | Δ | Δ | x | x | x |

Figure 17:
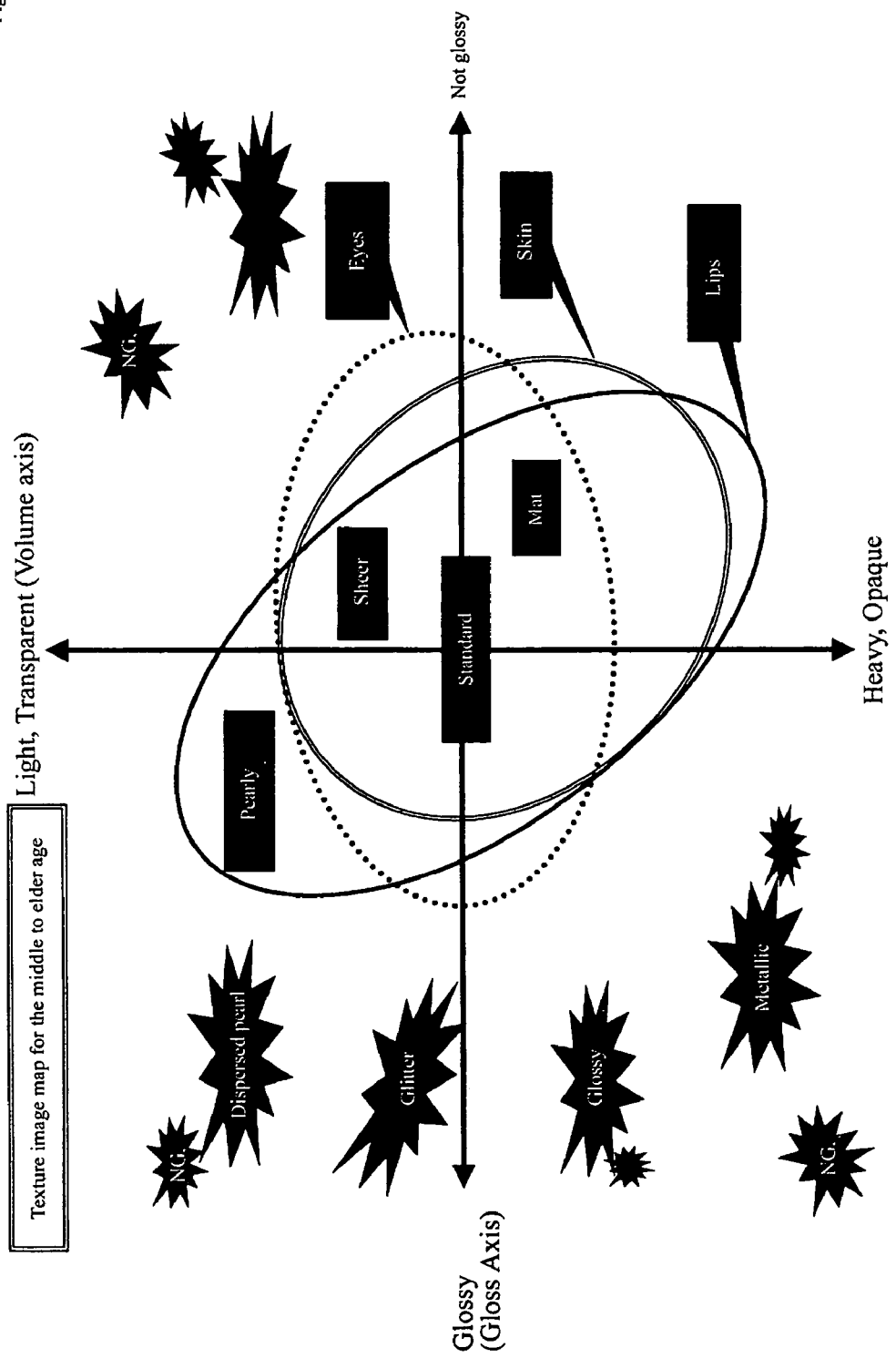
FIG. 17 is a graph showing a texture image map of the middle and elder age.

Based on the results of the questionnaire, the map of the texture regions where the skin of the middle to elder age is seemed to be beautiful is shown as a texture image map of FIG. 17. It was found that the skin and eyes existed in approximately close regions and that the standard, mat, and sheer textures were in texture regions where the unevenness of wrinkles and pores were not obvious. In the texture for making the skin seemed beautiful, the essential point was proper covering power and natural gloss. Textures in the light directions other than that were improper for makeup for the middle to elder age. With respect to the lips, there is a widely expanded adequate region and the mat, sheer, and pearly textures and the standard texture in the center can be exemplified. As a wettish type, the use option in combination with lip liner application is widened. However, the texture in the strongly wettish and strongly bright direction is improper.

Figure 7:
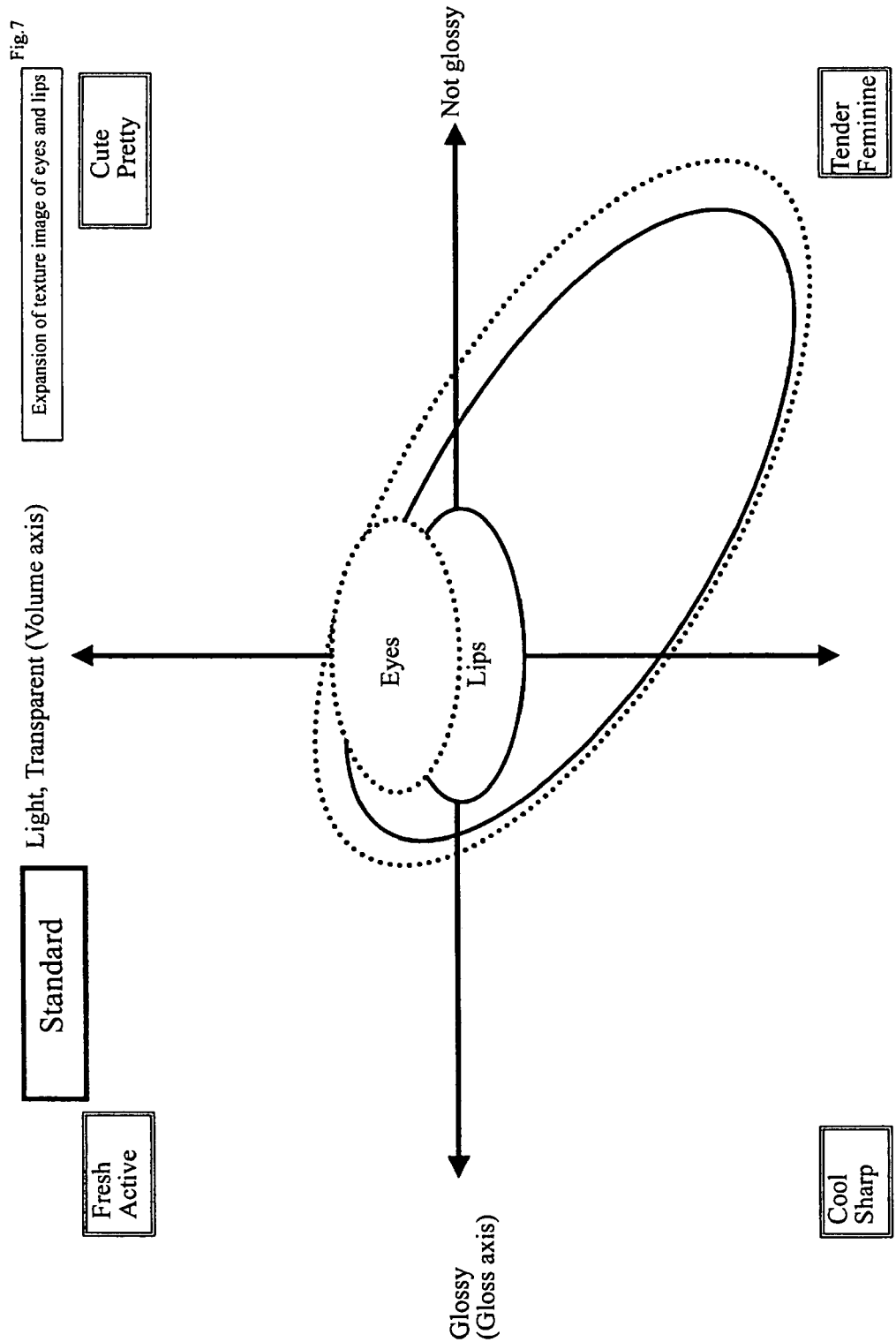
FIG. 7 is a graph showing a standard texture image map of the eyes and lips.
Figure 8:
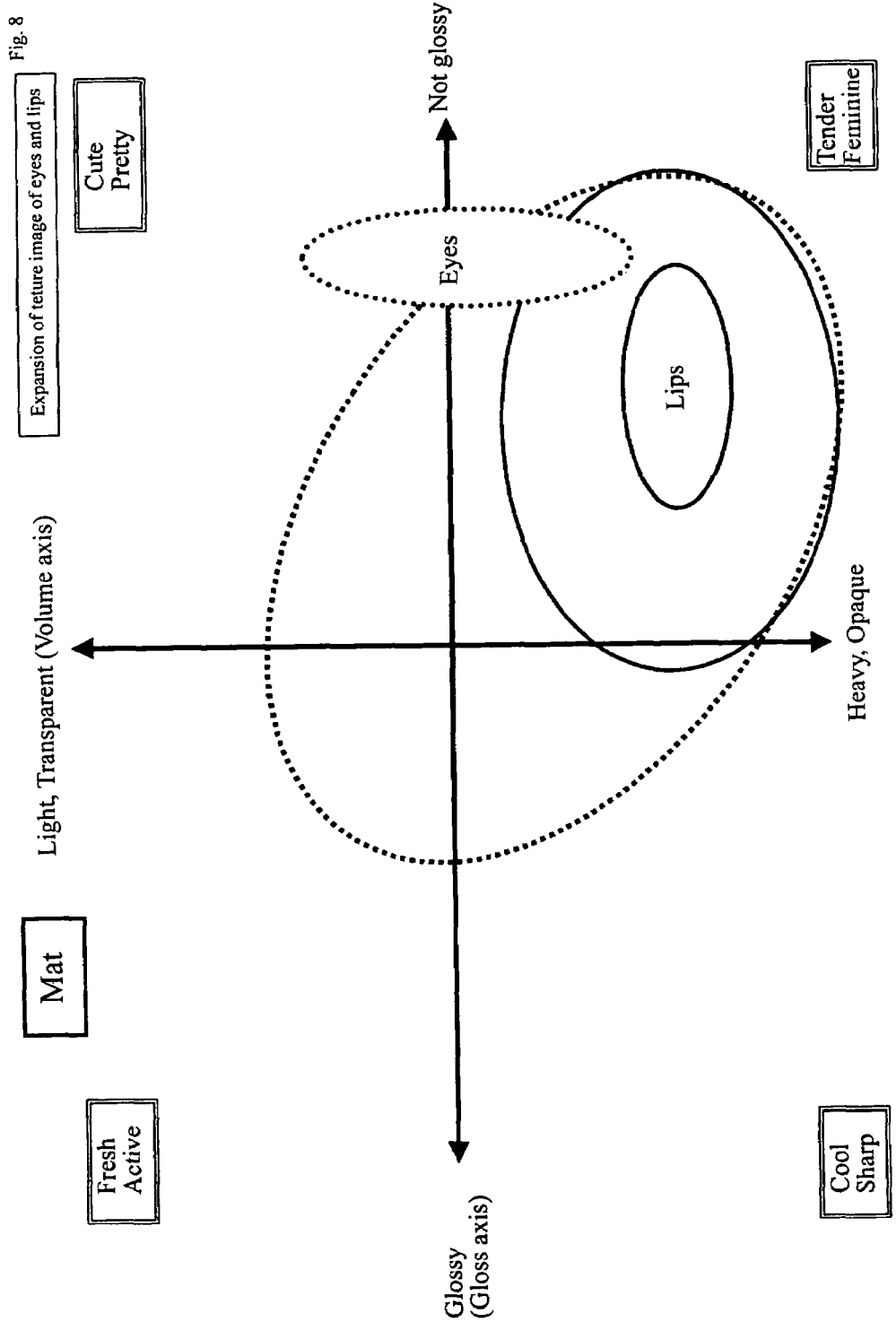
FIG. 8 is a graph showing a mat texture image map of the same.
Figure 9:
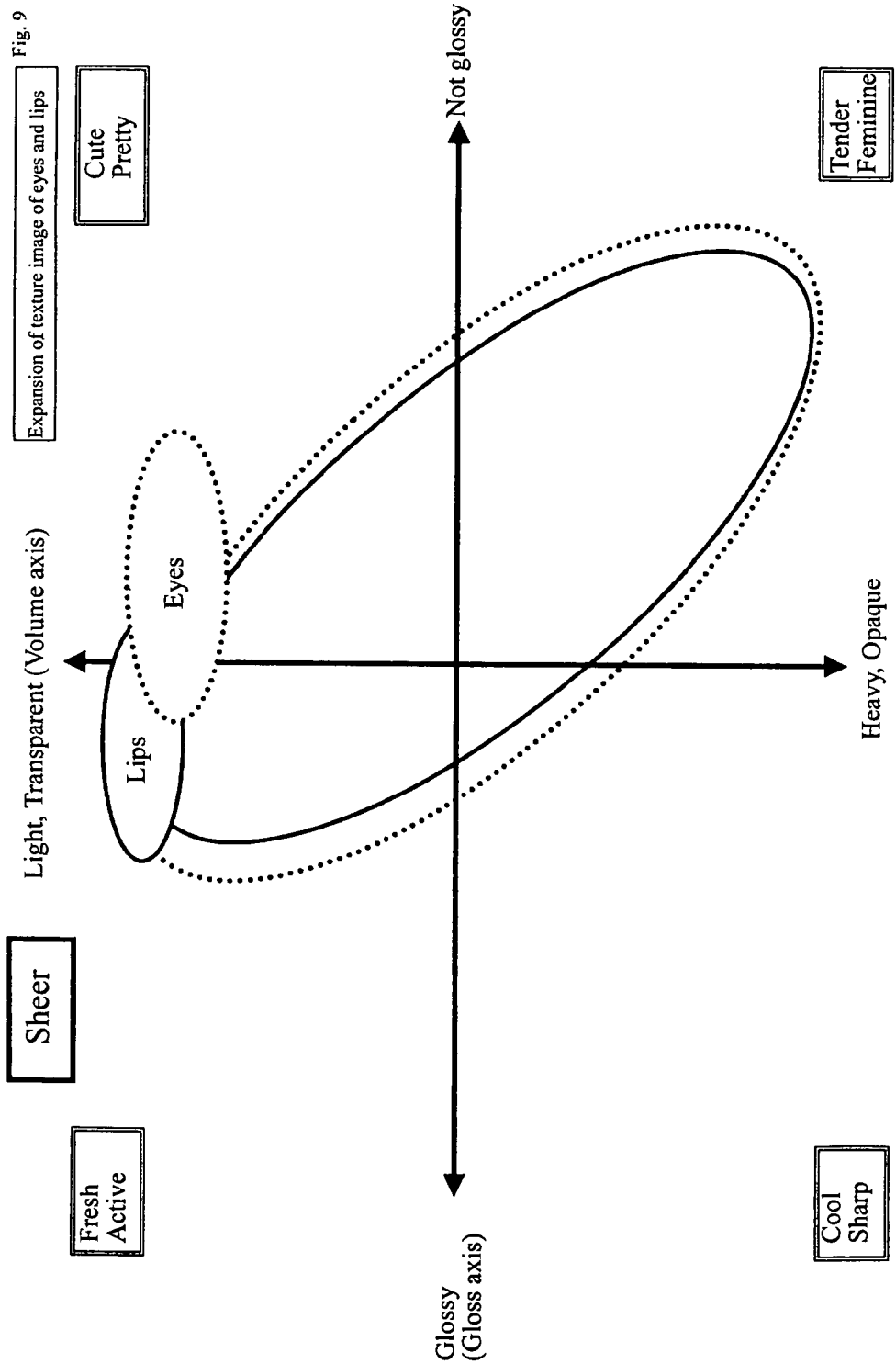
FIG. 9 is a graph showing a sheer texture image map of the same.
Figure 10:
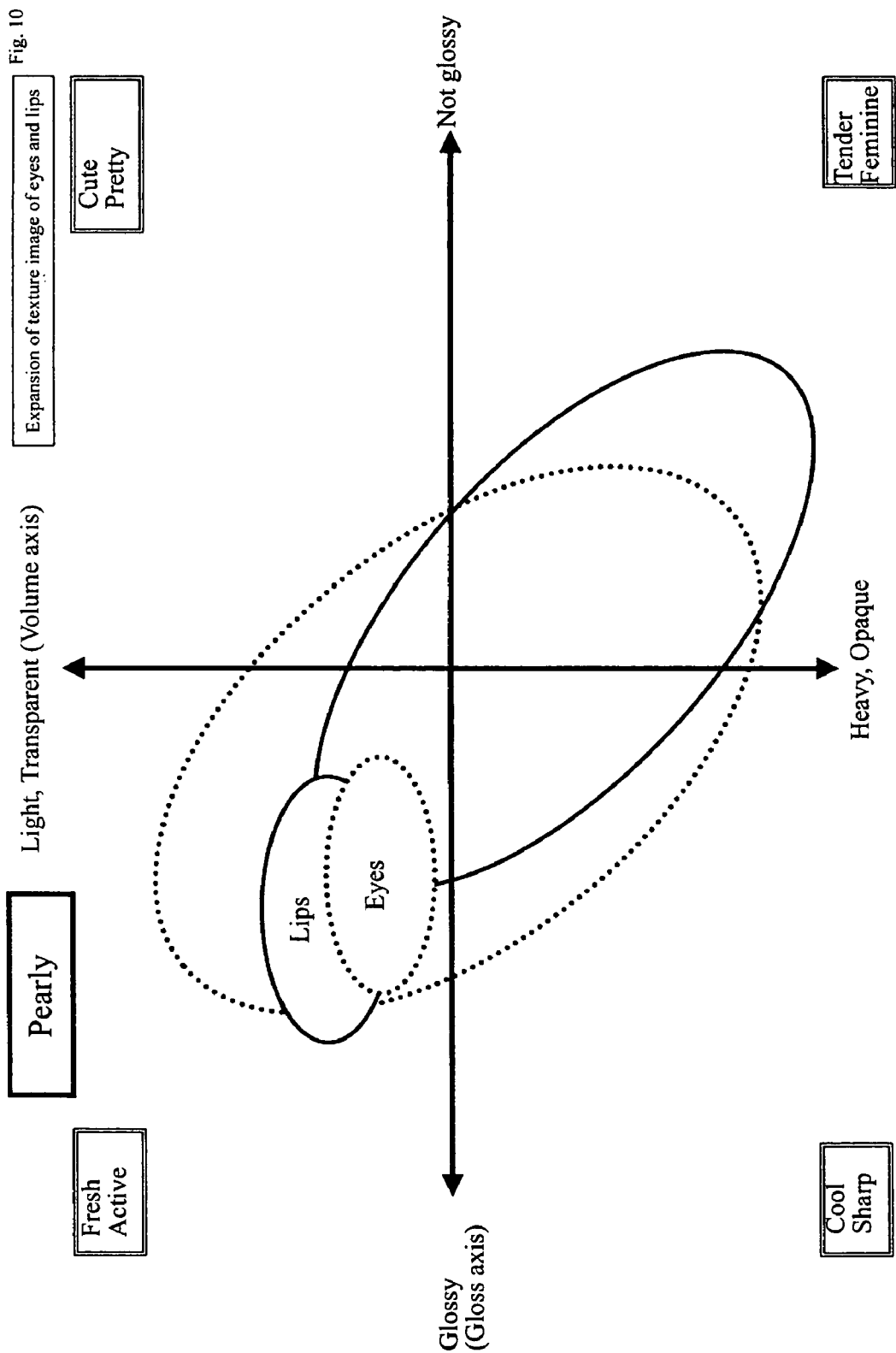
FIG. 10 is a graph showing a pearly texture image map of the same.
Figure 11:
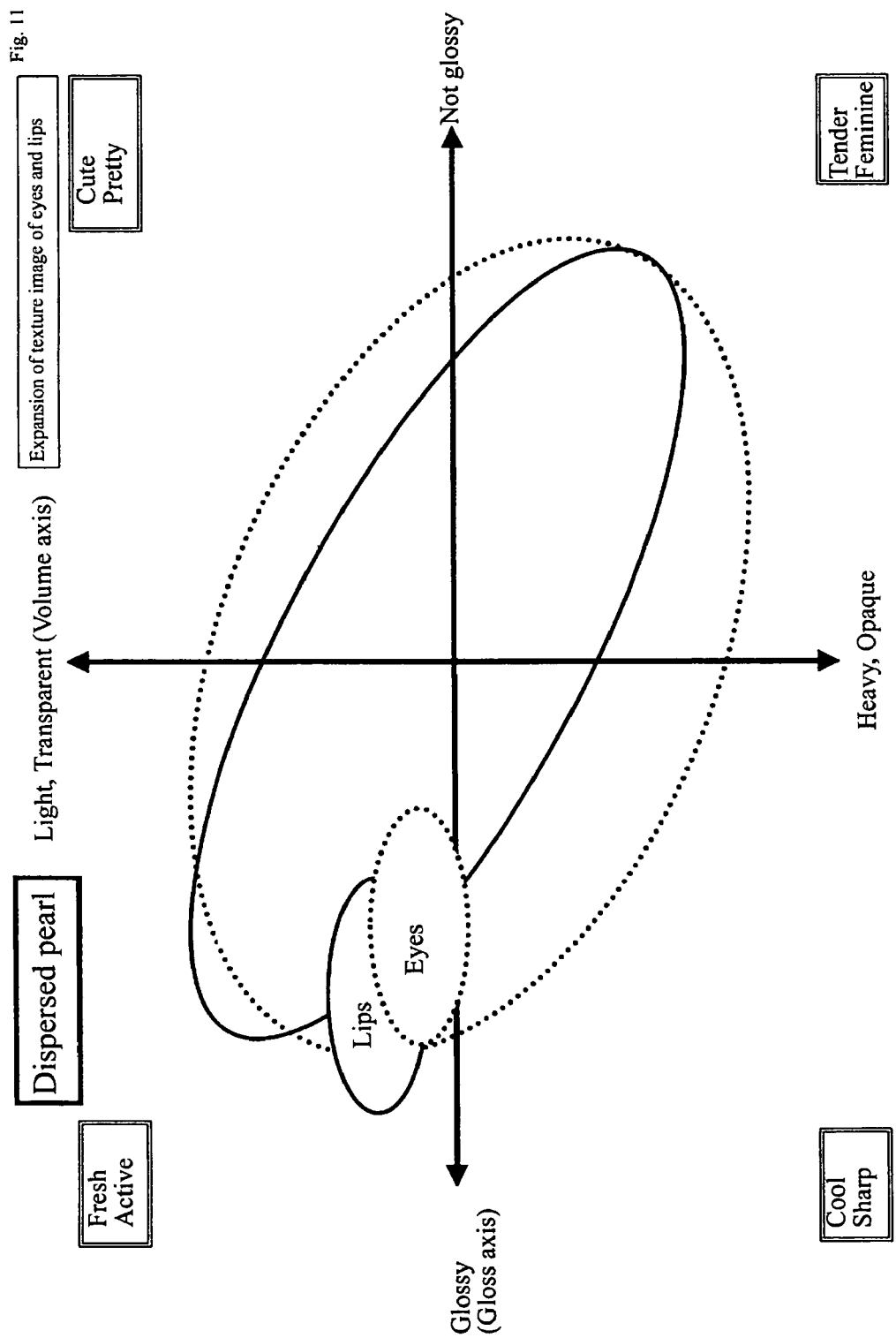
FIG. 11 is a graph showing a dispersed-pearl texture image map of the same.
Figure 12:
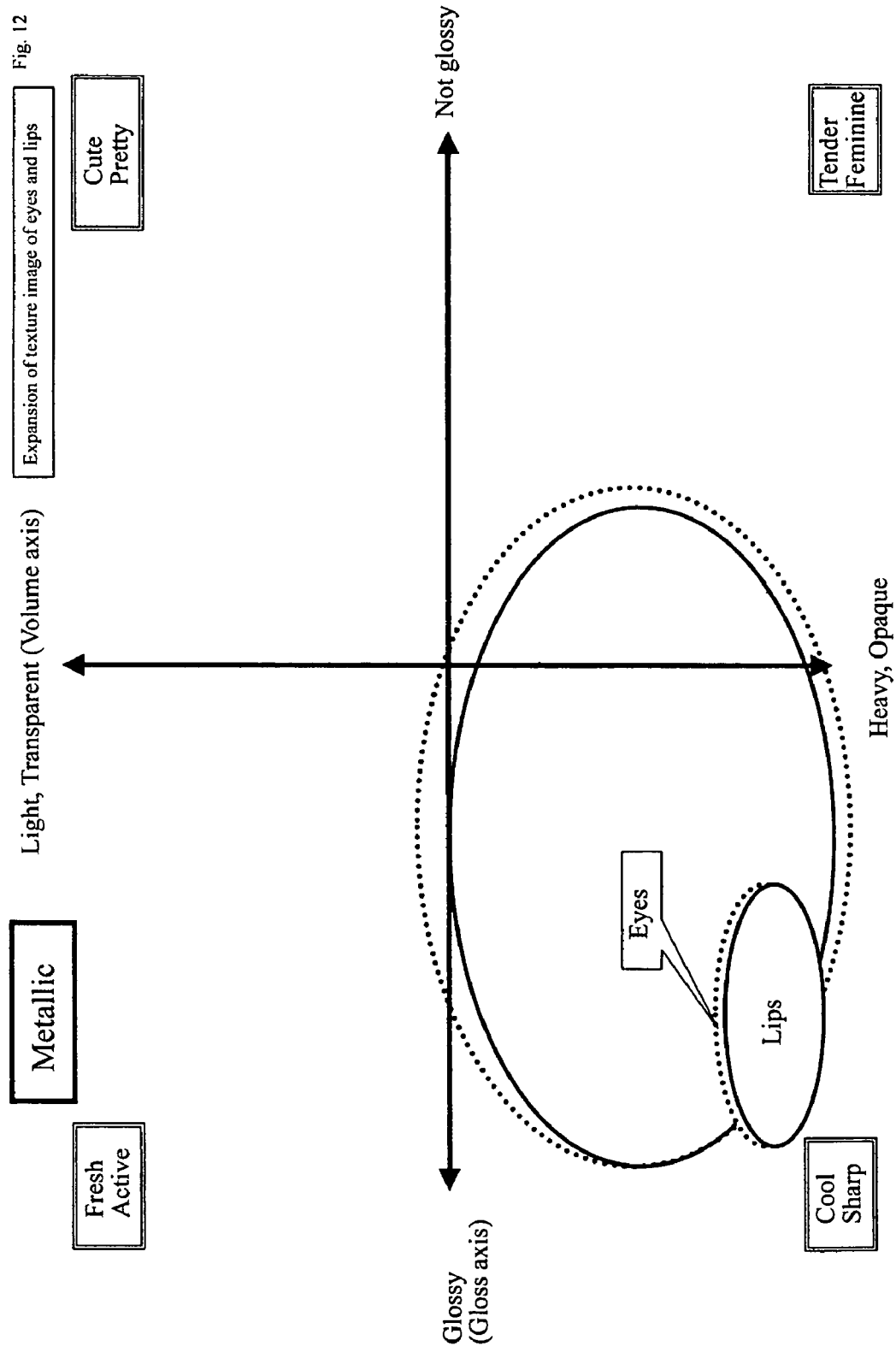
FIG. 12 is a graph showing a metallic texture image map of the same.
Figure 13:
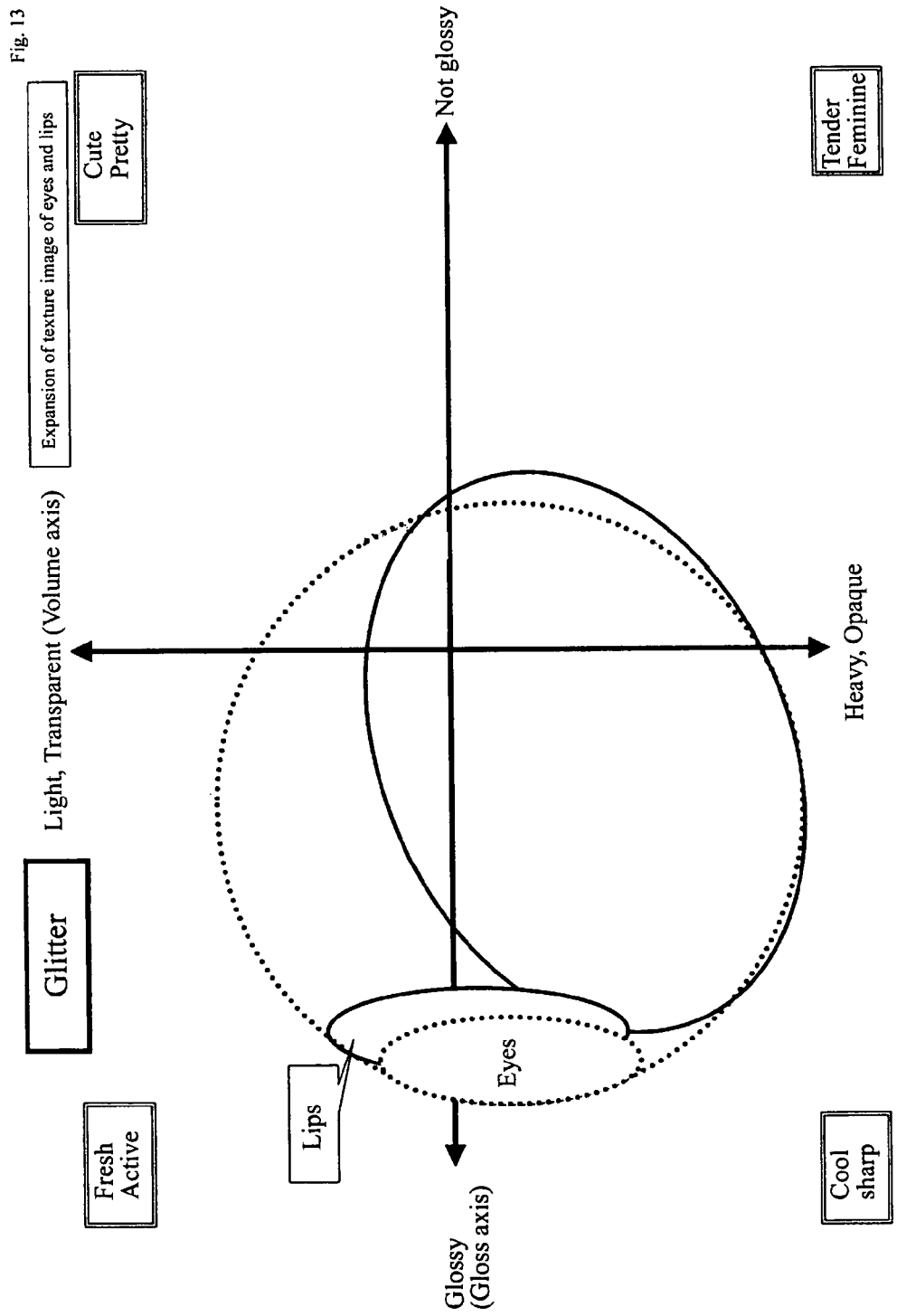
FIG. 13 is a graph showing a glitter texture image map of the same.
Figure 14:
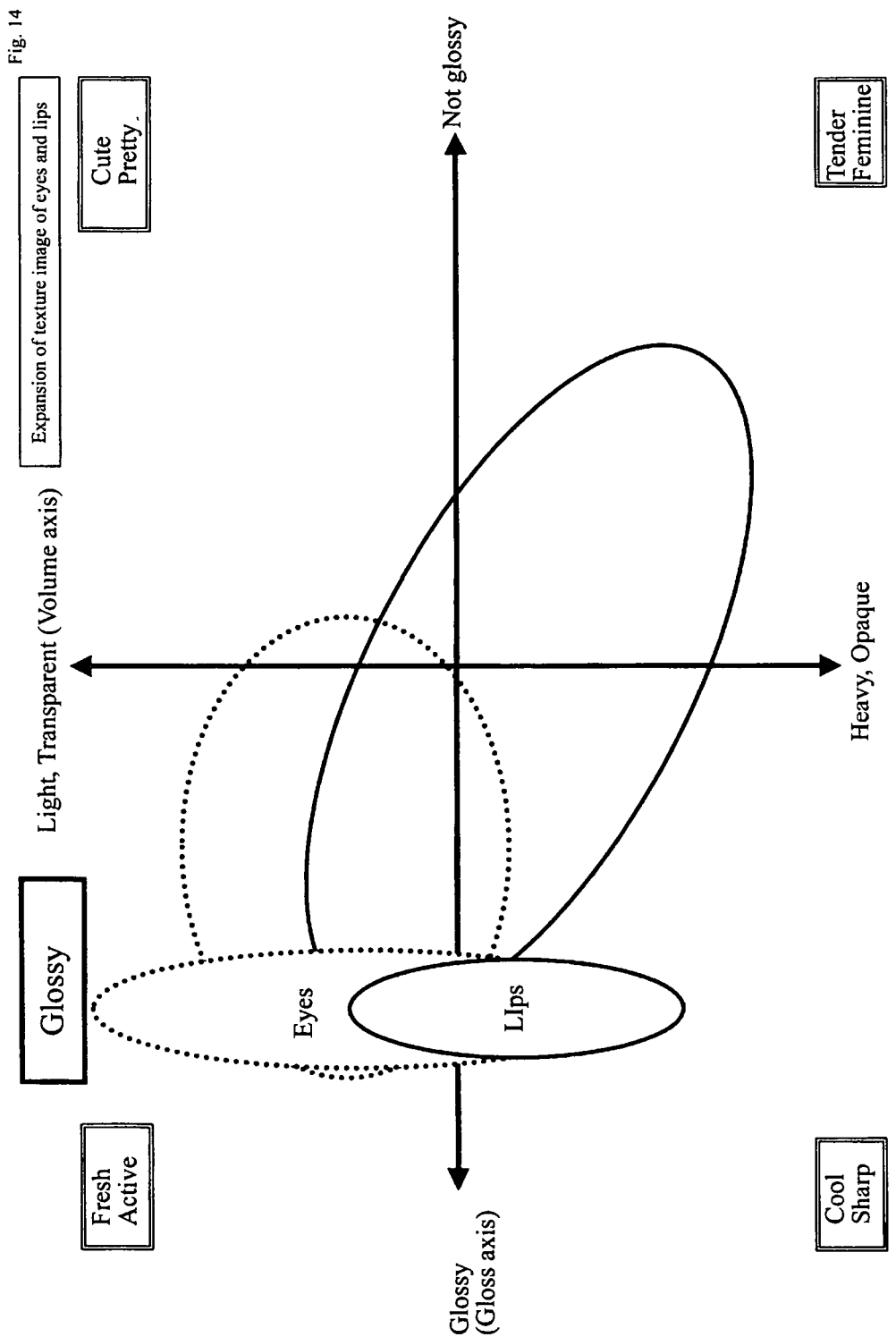
FIG. 14 is a graph showing a glossy texture image map of the same.
Figure 15:
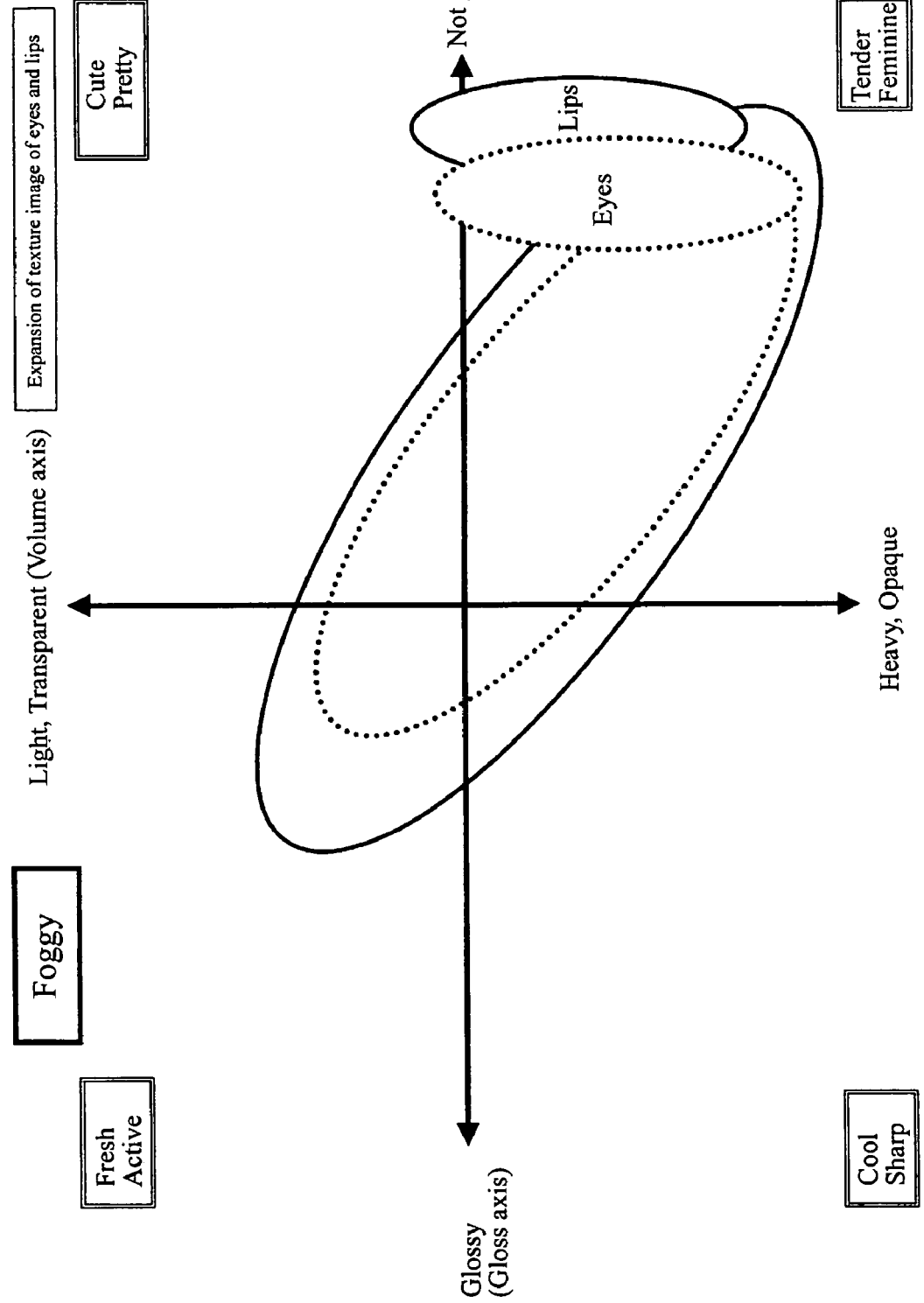
FIG. 15 is a graph showing a foggy texture image map of the same.

FIG. 1
1 Light, transparent
2 Volume axis
3 Glossy
4 Gloss axis
5 Not glossy
6 Heavy, opaque FIG. 2
1 Texture word map
2 Light, transparent (volume axis)
3 Sheer
4 Glossy (gloss axis)
5 Glitter
6 Glossy
7 Dispersed pearl
8 Pearly
9 Standard
10 Foggy
11 Not glossy
12 Metallic
13 Heavy, opaque
14 Mat FIG. 3
1 Light, transparent (volume axis)
2 Fresh/active
3 Sheer
4 Cute/pretty
5 Glossy (gloss axis)
6 Glitter
7 Glossy
8 Dispersed pearl
9 Pearly
10 Standard
11 Foggy
12 Not glossy
13 Cool/sharp
14 Tender/feminine
15 Metallic
16 Heavy, opaque
17 Mat FIG. 4
1 Expansion of texture image of skin base
2 Fresh/active
3 Light, transparent (volume axis)
4 Sheer
5 Cute/pretty
6 Glossy (gloss axis)
7 Pearly
8 Standard
9 Not glossy
10 Cool/sharp
11 Heavy, opaque
12 Mat
13 Tender/feminine FIG. 5
1 Expansion of texture image of eyes
2 Fresh/active
3 Light, transparent (volume axis)
4 Cute/pretty
5 Glossy (gloss axis)
6 Glitter
7 Glossy
8 Dispersed pearl
9 Pearly
10 Sheer
11 Standard
12 Mat
13 Foggy
14 Not glossy
15 Cool/sharp
16 Metallic
17 Heavy, opaque
18 Tender/feminine FIG. 6
Expansion of texture image of lips FIG. 7
1 Fresh/active
2 Standard
3 Light transparent (volume axis)
4 Expansion of texture image of eyes and lips
5 Cute/pretty
6 Glossy (gloss axis)
7 Eyes
8 Lips
9 Not glossy
10 Cool/sharp
11 Heavy, opaque
12 Tender/feminine FIG. 8
Mat FIG. 9
Sheer FIG. 10
Pearly FIG. 11
Dispersed pearl FIG. 12
Metallic FIG. 13
Glitter FIG. 14
Glossy FIG. 15
Foggy FIG. 16
Fresh/active
Texture map table
Cute/pretty
Skin
Eyes Lips
Sheer
Pearly
Standard
Dispersed pearl
Glossy
Glitter
Foggy
Mat
Metallic
Cool/sharp
* skin is selected depending on the state and fondness. Tender/feminine FIG. 17
1 Texture image map for the middle to elder age
2 Light, transparent (volume axis)
3 Dispersed pearl
4 Pearly
5 Foggy
6 Glossy (gloss axis)
7 Glitter
8 Standard
9 Sheer
10 Eyes
11 Not glossy
12 Glossy
13 Mat
14 Skin
15 Metallic
16 Lips
17 Heavy, opaque

The invention claimed is:

1. A method of applying makeup to the skin of a person comprising:
   (a) producing a texture word map by a method including:
      (i) selecting a plurality of texture words to express makeup textures,
      (ii) classifying the plurality of selected texture words into first and second character types,
      (iii) arranging the first character type words in the ordinate,
      (iv) arranging the second character type words in the abscissa,
      (v) arranging positional correlations of texture words in the coordinates of the ordinate and abscissa,
   (b) producing a texture image map by overlapping individual images on the texture word map, and
   (c) applying makeup to the skin of a person such that the applied makeup has a texture in accordance with the texture image map.

2. The method of claim 1, wherein the texture words include: (1) standard: a texture giving properly covering power and natural glossy impression; (2) mat: a texture giving a solemn, dull surface, heavy, and concealing impression; (3) sheer: a texture giving a transparent and light impression; (4) pearly: a texture giving a delicate and glossy impression like a smooth and lustrous pearl; (5) dispersed pearl: a texture giving a blinking and sparkling impression like dispersed pearls; (6) metallic: a texture giving a bright impression like a metal surface; (7) glitter: a texture giving a vividly bright impression; (8) glossy: a texture giving an impression of wet gloss and damp and strong luster; and (9) foggy: a texture giving a soft and powdery impression.

3. The method of claim 1, wherein the textures are classified into the characteristics austerity, transparency, and gloss, and wherein austerity and transparency are arranged collectively in the ordinate as a volume axis and wherein gloss is arranged in the abscissa as a gloss axis.

4. The method of claim 1, wherein each individual image includes four image types, including "cute/pretty," "fresh/active," "soft/feminine" and "cool/sharp."

5. A method of applying makeup to the skin of a person comprising:
   (a) producing a texture word map by a method including:
      (i) selecting a plurality of texture words to express makeup textures,
      (ii) classifying the plurality of selected texture words into first and second character types,
      (iii) arranging the first character type words in the ordinate,
      (iv) arranging the second character type words in the abscissa,
      (v) arranging positional correlations of texture words in the coordinates of the ordinate and abscissa,
   (b) producing a texture image map by overlapping individual images on four image zones, said image zones being partitioned by the ordinate and the abscissa on the texture word map, and
   (c) examining the texture image map based on results of a questionnaire regarding photographs of models to whom makeup has been actually applied to the skin, eyes, and lips,
   (d) producing a skin texture map, an eye texture map, and a lip texture map based on the questionnaire results; and
   (e) applying makeup to at least one of the skin, eyes, and lips of a person, said makeup having a texture corresponding to a respective appropriate texture image map.

6. The method of claim 5, wherein the texture words include: (1) standard: a texture giving properly covering power and natural glossy impression; (2) mat: a texture giving a solemn, dull surface, heavy, and concealing impression; (3) sheer: a texture giving a transparent and light impression; (4) pearly: a texture giving a delicate and glossy impression like a smooth and lustrous pearl; (5) dispersed pearl: a texture giving a blinking and sparkling impression like dispersed pearls; (6) metallic: a texture giving a bright impression like a metal surface; (7) glitter: a texture giving a vividly bright impression; (8) glossy: a texture giving an impression of wet gloss and damp and strong luster; and (9) foggy: a texture giving a soft and powdery impression.

7. The method of claim 5, wherein the textures are classified into the characteristics austerity, transparency, and gloss, and wherein austerity and transparency are arranged collectively in the ordinate as a volume axis and wherein gloss is arranged in the abscissa as a gloss axis.

8. The makeup method of claim 5 wherein each individual image includes four image types, including "cute/pretty," "fresh/active," "soft/feminine" and "cool/sharp."

9. The method of claim 5, further comprising: ordering the three texture image maps corresponding to the texture words for each image zone to produce texture map tables; and applying makeup with a texture according to the texture map tables.

10. The method of claim 5, wherein a correlation between textures or a balance between texture and image is expressed on the texture map.

11. The method of claim 9, wherein the texture words include: (1) standard: a texture giving properly covering power and natural glossy impression; (2) mat: a texture giving a solemn, dull surface, heavy, and concealing impression; (3) sheer: a texture giving a transparent and light impression; (4) pearly: a texture giving a delicate and glossy impression like a smooth and lustrous pearl; (5) dispersed pearl: a texture giving a blinking and sparkling impression like dispersed pearls; (6) metallic: a texture giving a bright impression like a metal surface; (7) glitter: a texture giving a vividly bright impression; (8) glossy: a texture giving an impression of wet gloss and damp and strong luster; and (9) foggy: a texture giving a soft and powdery impression.

12. The method of claim 9, wherein the textures are classified into the characteristics austerity, transparency, and gloss, and wherein austerity and transparency are arranged collectively in the ordinate as a volume axis and wherein gloss is arranged in the abscissa as a gloss axis.

13. The makeup method of claim 9, wherein each individual image includes four image types, including "cute/pretty," "fresh/active," "soft/feminine" and "cool/sharp."

* * * * *